(12) United States Patent
Azimi et al.

(10) Patent No.: US 6,239,510 B1
(45) Date of Patent: May 29, 2001

(54) REDUCED IMPACT POWER UP/DOWN MODE IN ELECTRICAL CIRCUITS

(75) Inventors: Kouros Azimi, West Chester; Bahram G. Kermani, Whitehall; Jonathan H. Fischer, Blandon, all of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/359,203

(22) Filed: Jul. 22, 1999

(51) Int. Cl.[7] ........................................................ H02J 1/00
(52) U.S. Cl. ............................................................ 307/38
(58) Field of Search ................................. 307/38, 41, 115, 307/126, 135; 361/167

(56) References Cited

U.S. PATENT DOCUMENTS

| | | | |
|---|---|---|---|
| 3,770,977 | * 11/1973 | Mcintosh | 307/41 |
| 3,980,943 | * 9/1976 | Cailleux et al. | 323/22 |
| 4,890,212 | * 12/1989 | Kumon et al. | 363/49 |
| 5,172,008 | * 12/1992 | Odagiri | 307/41 |
| 5,943,278 | * 8/1999 | Su | 365/204 |

* cited by examiner

Primary Examiner—Stephen W. Jackson
Assistant Examiner—Robert L. Deberadinis
(74) Attorney, Agent, or Firm—Duane Morris & Heckscher LLP

(57) ABSTRACT

An apparatus and method for reducing variations in a supply voltage signal. The voltage signal which powers a circuit is regulated by adding or removing a series of redundant loads to the circuit. The redundant loads are normally not connected to the circuit. However, when one of the loads of the circuit is switched out of the circuit, one or more of the redundant loads are switched into the circuit, and then removed gradually from the circuit. When one of the loads of the circuit is to be switched into the circuit, one or more of the redundant loads are switched into the circuit first, then switched out of the circuit when the load is switched in. Thus, the voltage supply sees almost the same load during a turn-on and turn-off transition period, and variations in the voltage signal are reduced.

30 Claims, 9 Drawing Sheets

REDUCED IMPACT POWER UP/DOWN MODE IN ELECTRICAL CIRCUITS

FIELD OF THE INVENTION

The present invention relates to electrical circuits, in particular, an apparatus for controlling variations in a voltage signal supplied to an electrical circuit.

DESCRIPTION OF THE RELATED ART

Most electrical circuits produced today are fabricated on a single substrate known as an integrated circuit (IC) chip. These IC chips are often interconnected via further substrates, such as printed circuit boards. The IC chips are typically connected to each other by metal traces formed on the surface of the circuit boards. The IC chips may include active devices such as logic circuitry or memory cells. The plurality of IC chips on the circuit board are typically controlled by a microprocessor or central processing unit (CPU) which may or may not be disposed on the board. The circuit board also usually includes a clock generator and a voltage source, both of which may alternatively be located off circuit board. The clock generator and the voltage source produce signals which are applied to the IC chips to make them operate. The IC chips along with the CPU and other associated discrete circuit elements form a circuit device for effecting a particular task.

While the circuit device is operating, various IC chips may be active at different times. Thus, some chips are "on" while others are "off." Typically, a single voltage source provides power to all the IC chips on a given circuit board. In order to conserve power, the CPU often turns "off" IC chips which are not presently needed. Typically, the IC chip is switched "off" by stopping a clock signal (produced by the clock generator) to the device, rather than removing the voltage signal supplied by the voltage source. When these chips (i.e. those switched "off") are needed again by the device, they are switched back "on" by the CPU, by reapplication of the clock signal. Each time an IC chip is turned "on" or "off" by the CPU, the voltage source must compensate for the increasing and decreasing load. In order to accomplish this, the voltage source includes a feedback loop which serves to keep the voltage signal at a constant level no matter what the load. However, the constant adding and removing of loads from the voltage source causes variations in the voltage signal during the transition time between "on" and "off" states. These variations in the voltage signal can lead to malfunctions in the circuit device.

FIG. 1 shows an exemplary circuit device 10. The device 10 includes a substrate 15 with IC chips 20, 25, 30, and 35 attached thereto. The circuit device 10 also includes a CPU 40 for controlling the operations of the chips 20–35. The chips 20–35 are connected to the CPU 40 and to the other chips by metal traces (not shown) formed on the substrate 15. When the CPU 40 determines that one of the chips 20–35 is not presently needed for operation of the circuit device 10, the CPU issues a command which removes the clock signal from the particular chip. When the particular chip is again required by the circuit device 10, the CPU issues a command which returns the clock signal to the particular device. When a device is turned "on" or "off" by the CPU 40, a large variation in the supply voltage occurs as shown in FIGS. 2(a) and 2(b), explained in detail below.

FIG. 2(a) shows a typical voltage signal during the "power down" (i.e. turning "off") of one of the chips 20–35 of the circuit device 10. Note that at the time the particular chip (e.g. chip 20) is powered down, time $T_0$ in the figure, the voltage supply signal $V_{dd}$ experiences a rise due to the decreased load. This higher than normal supply voltage can cause significant damage to the other chips (e.g. chips 25–35) of the circuit device 10. FIG. 2(b) shows a typical voltage signal during the "power up" (i.e. turning "on") of one of the chips 20–35 of the circuit device 10. Note that at the time the particular chip (e.g. chip 20) is powered up, time $T_0$ in the figure, the voltage supply signal $V_{dd}$ experiences a fall due to the increased load. This variation in the voltage signal can cause various problems for the circuit device 10. In particular, each circuit device 10 has a threshold voltage $V_T$ which protects the device from undervoltage conditions. If the supply voltage for the circuit device 10 falls below this value $V_T$, the entire device will reset. Often, a variation due to the addition of a load causes the supply voltage signal $V_{dd}$ to dip below the $V_T$ level as shown in the figure. This causes the circuit device 10 to reset even though no reset was intended.

In order to solve the above problems, capacitors are often connected externally of the circuit device 10. These capacitors are typically large capacitance elements which significantly reduce the variations in the supply voltage signal. However, in many applications, there is insufficient room to add large external capacitors. For instance, in a pacemaker system, the only elements which may be used are a device and a battery. Therefore, there is currently a need for an apparatus for controlling variations in a voltage supply signal which can integrated with a device.

SUMMARY OF THE INVENTION

The present invention is an apparatus for reducing variations in a supply voltage signal of a circuit including an actual load. The variations are reduced by adding at least one redundant load to the circuit. An electrical signal for operating the different devices of the circuit is applied to both the redundant load(s) and actual load at different times during the operation of the circuit. The electrical signal is applied to the redundant load(s) when the actual load is not operating and is removed when the actual load is operating. The substitution of redundant load(s) for the actual load is performed by a controller. The adding and removing of loads from the electrical signal causes variations in the supply voltage for the circuit to be minimized.

The above and other advantages and features of the present invention will be better understood from the following detailed description of the preferred embodiments of the invention which is provided in connection with the accompanying drawings.

BRIEF DESCRIPTION OF THE DRAWINGS

FIGS. 6(a)–(f) are a series of timing diagrams for the switches shown in FIG. 4.

FIGS. 6(g)–(l) are a series of timing diagrams for the switches shown in FIG. 5.

DETAILED DESCRIPTION

Figure 3:
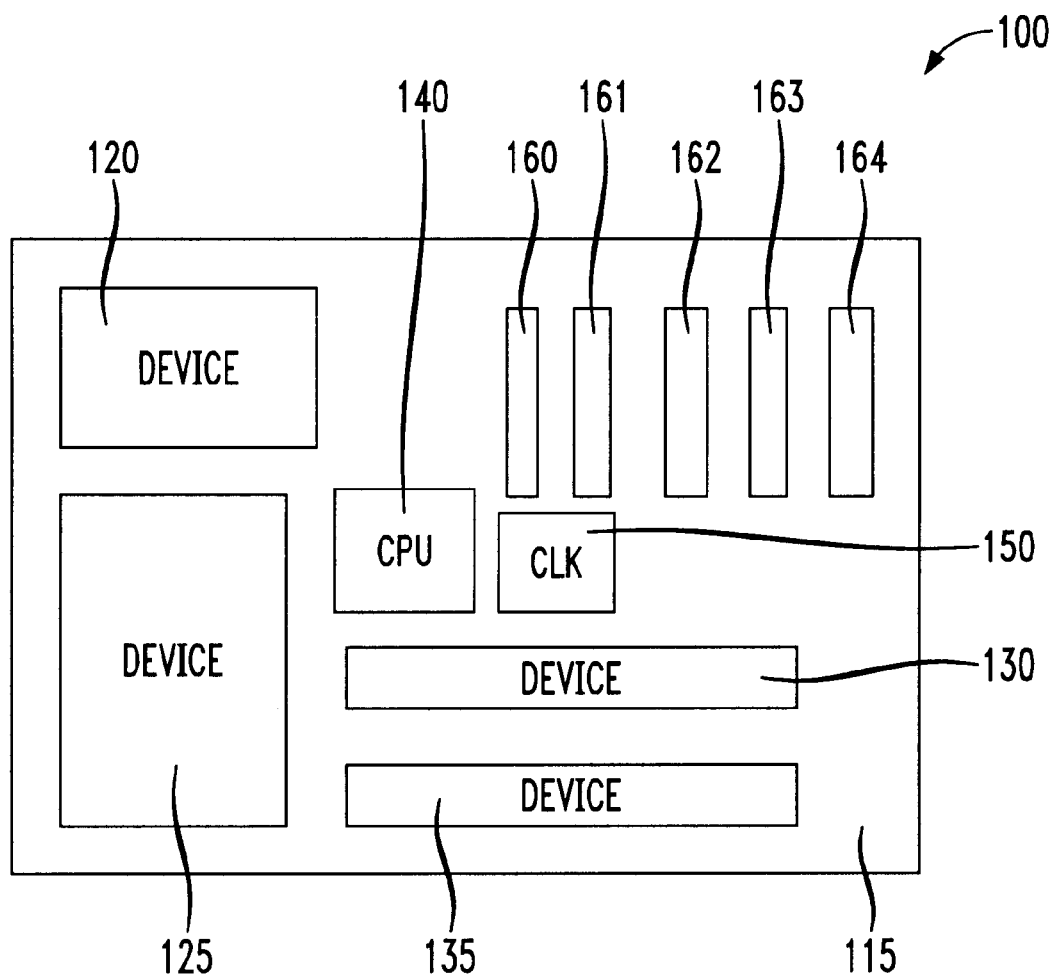
FIG. 3 shows a chip according to the present invention.

Referring to FIG. 3, there is shown an exemplary circuit device 100. The circuit device 100 includes devices 120, 125, 130, and 135, a CPU 140, a clock generator 150, and a plurality of redundant loads 160–164 arranged on a substrate 115 (e.g. circuit board or silicon substrate). The CPU 140 is coupled to the devices 120–135, the clock generator 150 and the redundant loads 160–164. The clock generator 150 provides a clock signal to all the devices 120–135. The CPU 140 controls the operations of the devices 120–135 as they are required by the circuit device 100. In addition to a ground signal (not shown), each device 120–135 is supplied a voltage signal from a voltage supply (not shown) which provides power for the device. The CPU turns the various devices 120–135 "on" and "off" by adding or removing the clock signal (produced by the clock generator 150), respectively.

In the exemplary embodiment, devices 120–135 are integrated circuits, or parts of an integrated circuit, however, one or all of these elements may alternatively be any other circuit element which operates with a clock signal. Further, in the exemplary embodiment the redundant loads 160–164 are formed as metal traces on the surface of the device substrate 115, however, the redundant loads may be formed as discrete circuit elements (e.g. resistors, capacitors, inductors), or in any other manner known to those skilled in the art. Additionally, although in the exemplary embodiment there are a plurality of redundant loads 160–164, there may alternately be only one redundant load, as long as the redundant load has an impedance greater than or less than the impedance of the actual load (i.e. the impedance of one of devices 120–135) by approximately 50%. The process for choosing impedance values for the redundant load or loads is explained below with reference to FIGS. 4 and 5. The CPU 140 controls the activation of devices 120–135 and redundant loads 160–164 through a plurality of switches $S_0$–$S_5$ (see FIGS. 4, 5). The CPU 140 controls the devices 120–135 and the loads 160–164 by either an internal program, or by a program communicated to the CPU from a source remote from the device 100. One aspect of the CPU's function is to manage the devices 120–135, so that they are only active (i.e. supplied with a clock signal) when they are being used. Thus, the CPU 140 "powers up" or "powers down" the devices 120–135 based on the requirements of the system in which the device 100 is utilized. The "power up" or "power down" of each device 120–135 is accomplished by adding or removing a clock signal from the respective device, as explained below. The removing (i.e. stopping) or adding (i.e. resuming) of the clock signal is accomplished through a circuit 200 coupled between the CPU 140 and the clock generator 150, and each of the devices 120–135 (See FIGS. 4–5).

Figure 4:
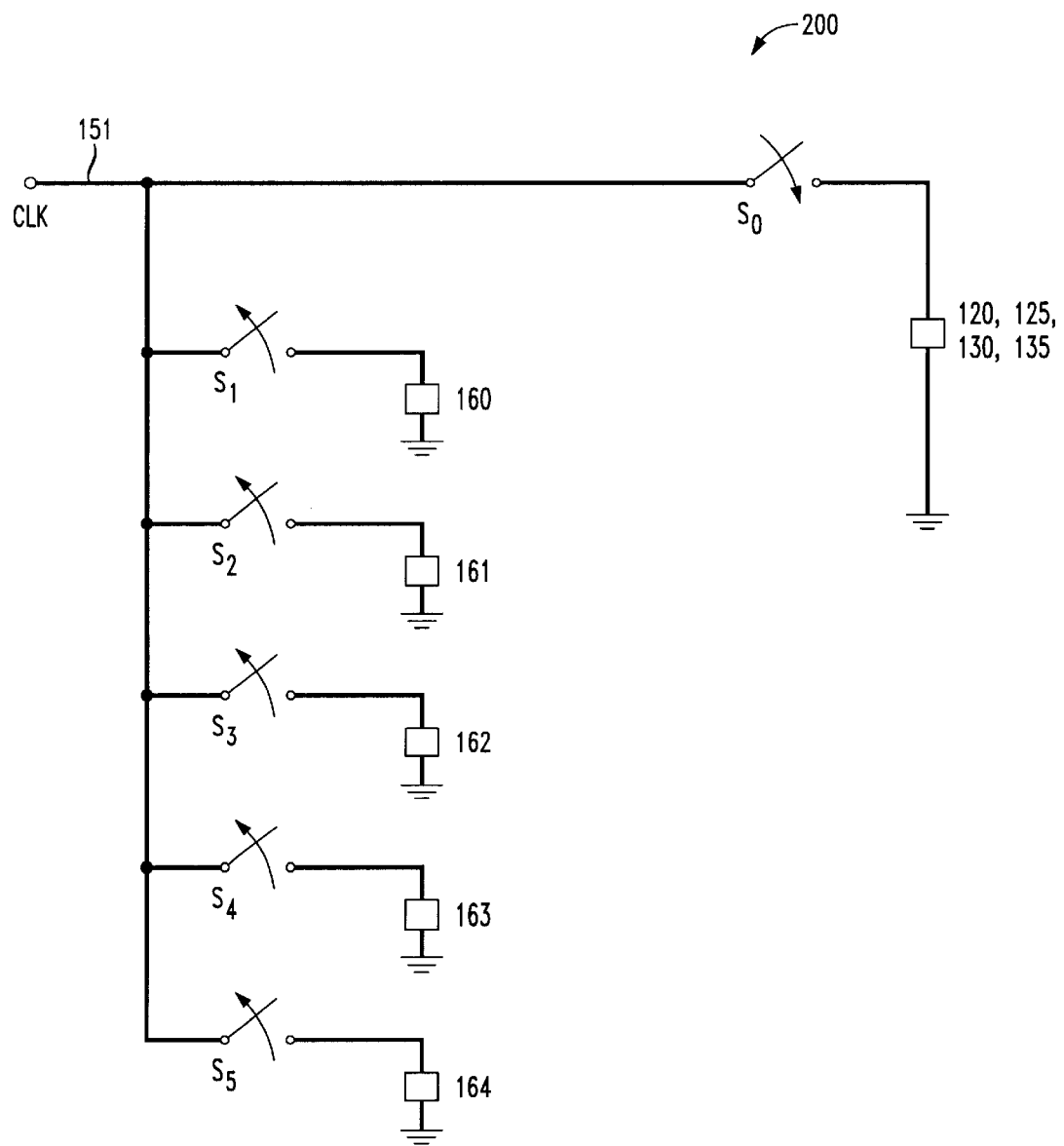
FIG. 4 is a schematic diagram showing the circuit of the present invention during a power up phase.
Figure 5:
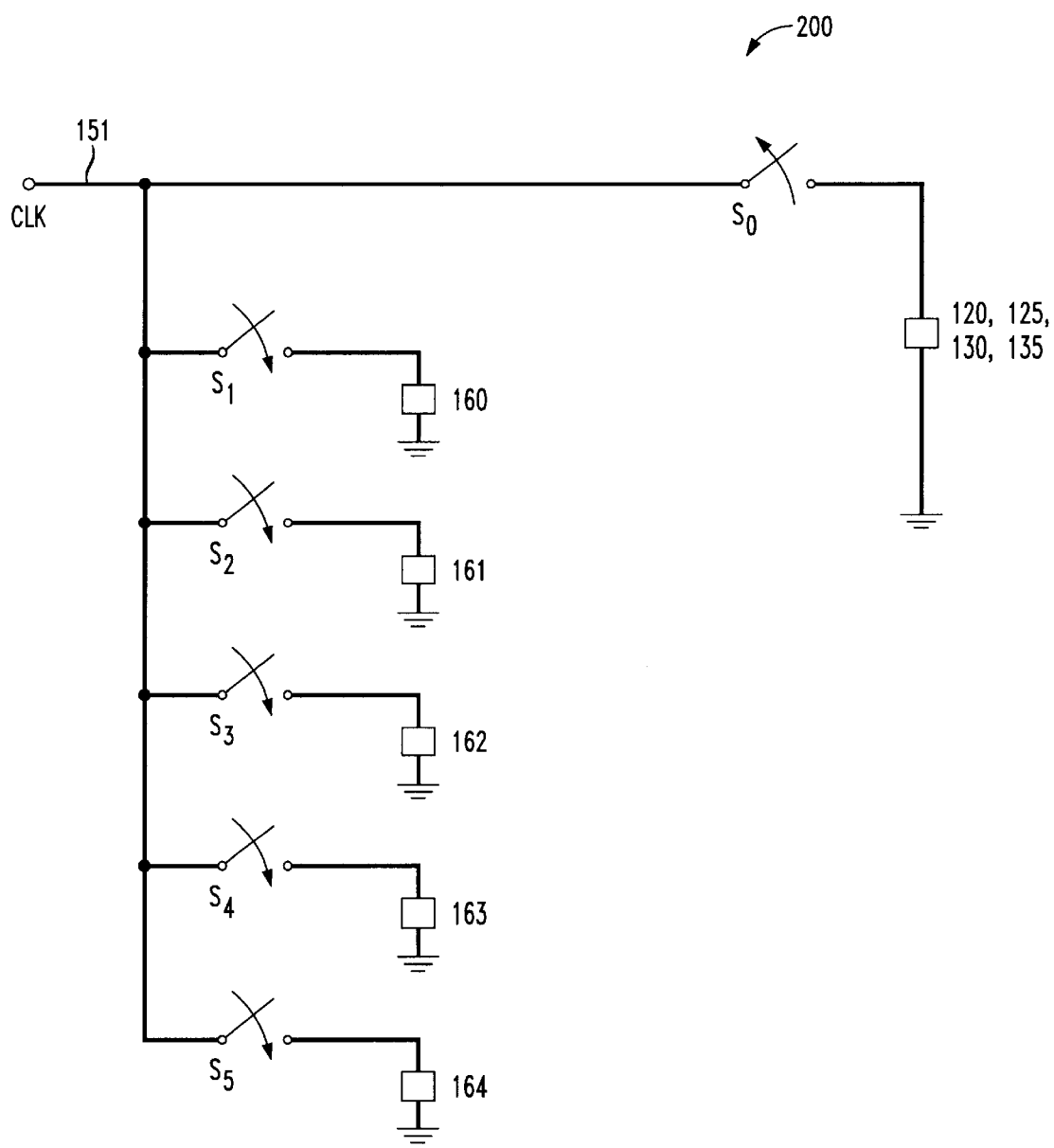
FIG. 5 is a schematic diagram showing the circuit of the present invention during a power down phase.
Figure 6A:
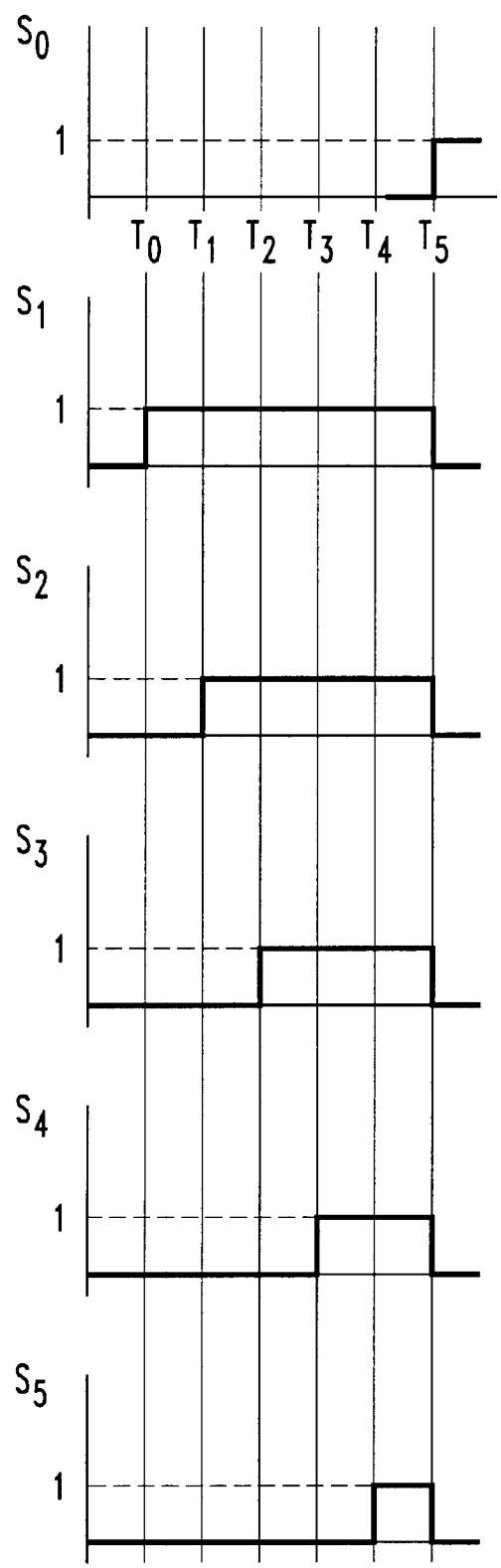
Figure 6B:
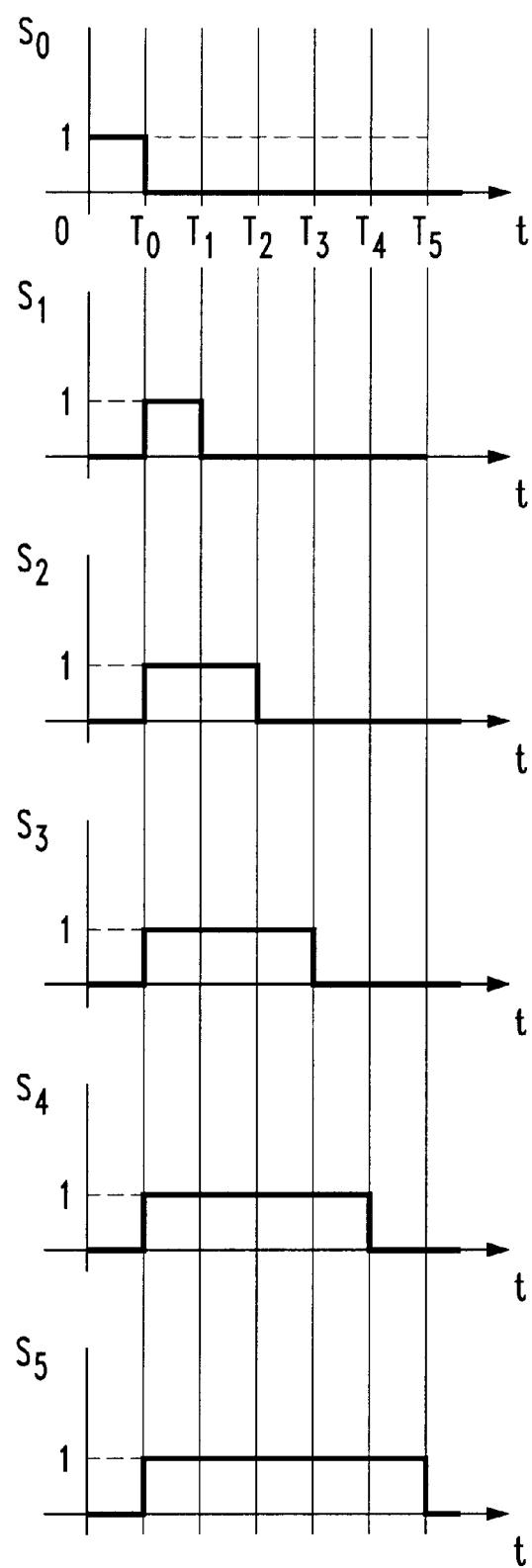

FIGS. 4 and 5 are schematic diagrams showing the operation of an exemplary circuit 200 according to the present invention. The circuit 200 is coupled between the CPU 140, the clock generator 150, the redundant loads 160–164, and each of the devices 120–135. Each device 120–135 may include a separate circuit 200 which has redundant loads 160–164 matched to the actual current drawn by the respective device, or the devices 120–135 may share a circuit 200 and set of redundant loads 160–164. In the exemplary embodiment, where the redundant loads 160–164 are connected in parallel, the redundant loads 160–164 preferably have impedance values greater than the impedance of the actual load (i.e. the impedance of one of the devices 120–135). It is necessary to make the impedance of the redundant loads greater than the impedance of the actual load because the parallel coupling of the loads 160–164 causes the clock to see a lower impedance then each of the loads would have individually because of impedance division effects. Since resistance is directly proportional to impedance, as resistance is raised, so is impedance and vice versa. For example, if the actual device 120–135 were a 100 ohm ($\Omega$) resistor with a specified impedance, the parallel-coupled redundant loads may each comprise 500$\Omega$ resistors with associated impedance values. If the redundant loads 160–164 were alternatively connected in series with one another (not shown), the loads would preferably have a smaller impedance than the actual load (i.e. the impedance of one of the devices 120–135). For example, if the actual device 120–135 were a 100$\Omega$ resistor with a specified impedance, the redundant loads 160–164 may each comprise a 20$\Omega$ resistors with associated impedances. The redundant loads 160–164 also preferably represent incremental portions of the actual load drawn by the device 120–135 (e.g. 20$\Omega$ is 1/5 of the 100$\Omega$ actual load in the series coupled example above). It is important that the loads 160–164 be incremental portions of the actual load so that the impedance on the clock line can be gradually raised or lowered to reach the actual impedance value.

The circuit 200 operates to add or remove the set of redundant loads 160–164 from a clock line 151 coupled to the redundant loads and the actual load (i.e. the load drawn by one of the devices 120–135). The adding and removing of the actual load and the redundant loads from the clock line directly affects the supply voltage for the circuit device 100. In particular, each time a load (actual or redundant) is removed from the clock line 151, the particular load is removed from the supply voltage, and the supply voltage experiences a rise due to the respective decrease in total load. Each time a load (actual or redundant) is added to the clock line 151, the particular load is added to the supply voltage, and the supply voltage experiences a fall due to the respective increase in total load. Thus, when the redundant loads 160–164 are added and removed, the variation in the supply voltage signal are less because the redundant loads 160–164 each draw less power than the actual load. As explained above, as few as one redundant load may be utilized without departing from the scope of the invention. In the case where one redundant load is used, the impedance value of the redundant load would preferably be approximately 50% or 150% of the impedance of the actual load. In this way, the impedance of the circuit can be raised or lowered to the actual impedance value (i.e. the impedance of one of the devices 120–135) from either a higher impedance (e.g. 150% redundant load) or a lower impedance (50% redundant load), and thus variations in the voltage signal are diminished. FIG. 4 shows the operation of the circuit during a "power up" phase, and FIG. 5 shows the operation of the circuit during a "power down" phase.

The circuit 200 couples a clock signal generated by the clock generator 150 and propagated on clock line 151 to each of the devices 120–135 of the device 100. Each of the devices 120–135 are connected to the clock line 151 and a set of redundant loads 160–164 by switches $S_0$–$S_5$, respectively. The switches $S_0$–$S_5$ receive control signals from the CPU 140 (see FIG. 3) which turn the switches on and off.

In operation, when a device 120–135, for example device 120, receives a "power up" signal from the CPU, switches $S_1$–$S_5$ are closed sequentially beginning with switch $S_1$. Switch $S_5$ is activated (i.e. closed) just prior to the time when the actual power up of the device 120–135 is scheduled to take place. The closing of these switches $S_1$–$S_5$ brings the redundant loads 160–164 into the circuit sequentially, thus raising the load on the voltage supply incrementally. When all the switches $S_1$–$S_5$ are closed, the load on the voltage supply equals the load of the device 120. Switches $S_1$–$S_5$ are then opened simultaneously with switch $S_0$ being closed. Thus, the redundant loads 160–164 are replaced by the actual load (i.e. the load drawn by device 120) and the voltage supply sees only small variations. FIG. 6(a)–(f) show the timing diagrams for switches $S_1$–$S_5$ during the "power up" phase.

The "power down" phase works just the opposite of the "power up" phase. When the CPU 140 receives a command indicating the need to power down a device 120–135, for example device 120, the CPU opens switch $S_0$ and simultaneously closes switches $S_1$–$S_5$. When all the switches $S_1$–$S_5$ are closed, a redundant load equal to the actual load of device 120 is introduced into the circuit 200. Thus, the voltage supply sees almost no variation due to the substitution of an almost identical load (i.e. loads 160–164) for the actual load. The redundant loads 160–164 are then removed one-by-one by opening switches $S_1$–$S_5$, beginning with switch $S_1$. When the last switch $S_5$ is opened, the redundant loads 160–164 are effectively removed from the circuit. Since the redundant loads are removed sequentially, the voltage supply does not see a large variation. FIG. 6(g)–(l) shows the timing diagrams for switches $S_0$–$S_5$ during the "power down" phase.

Figure 1:
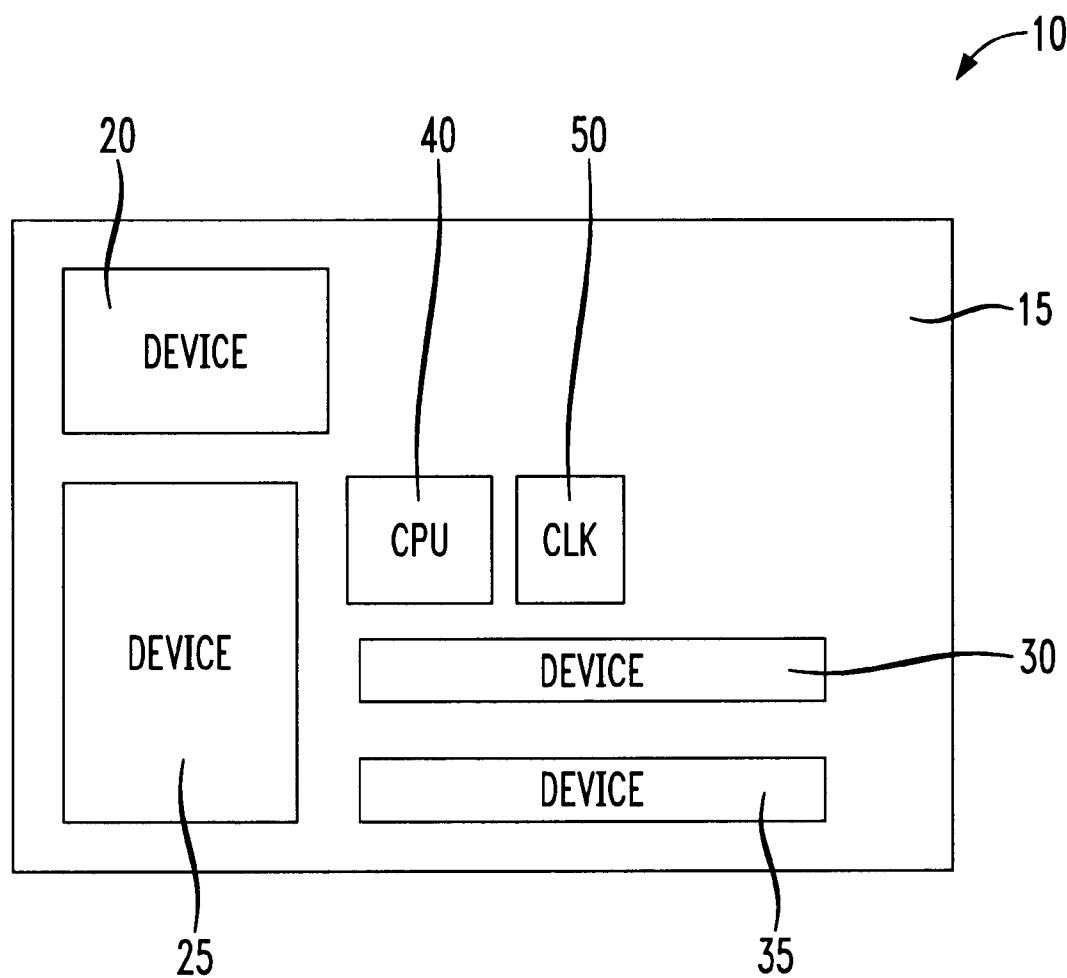
FIG. 1 shows a conventional chip substrate with devices placed thereon.
Figure 2A:
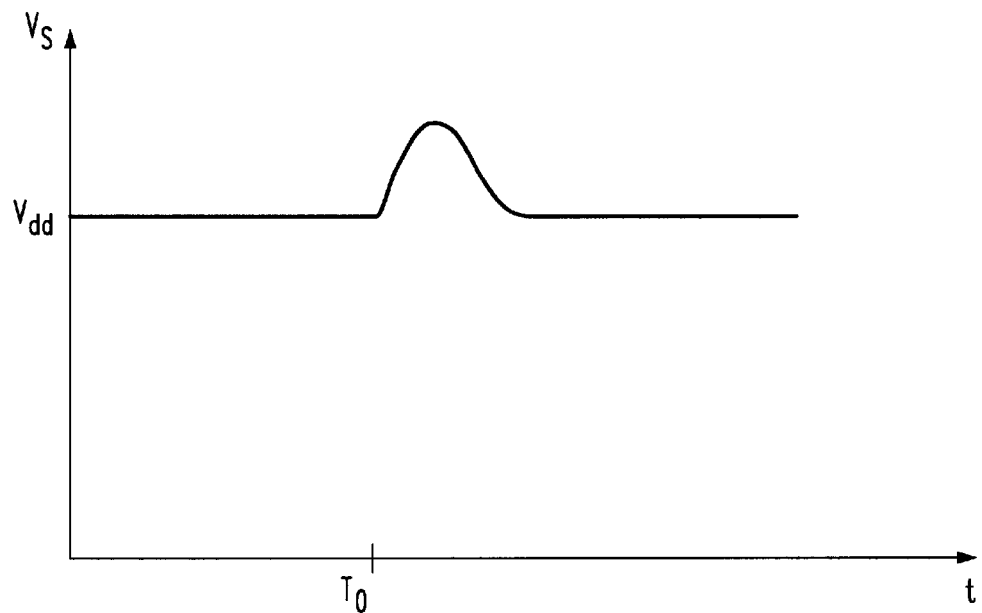
FIG. 2(a) is a graph showing the supply voltage of a conventional chip during power up of one of its devices.
Figure 2B:
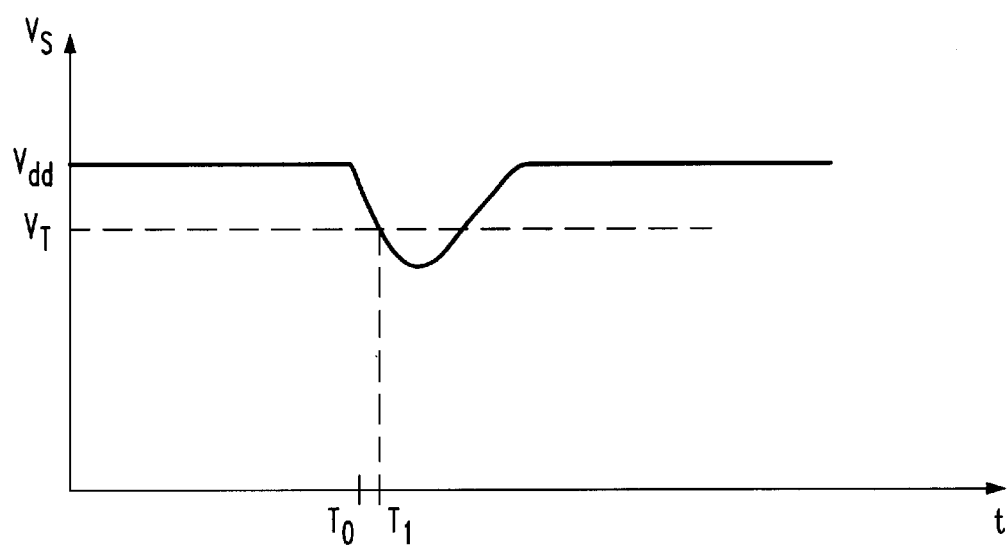
FIG. 2(b) is a graph showing the supply voltage of a conventional chip during power down of one of its devices.
Figure 7A:
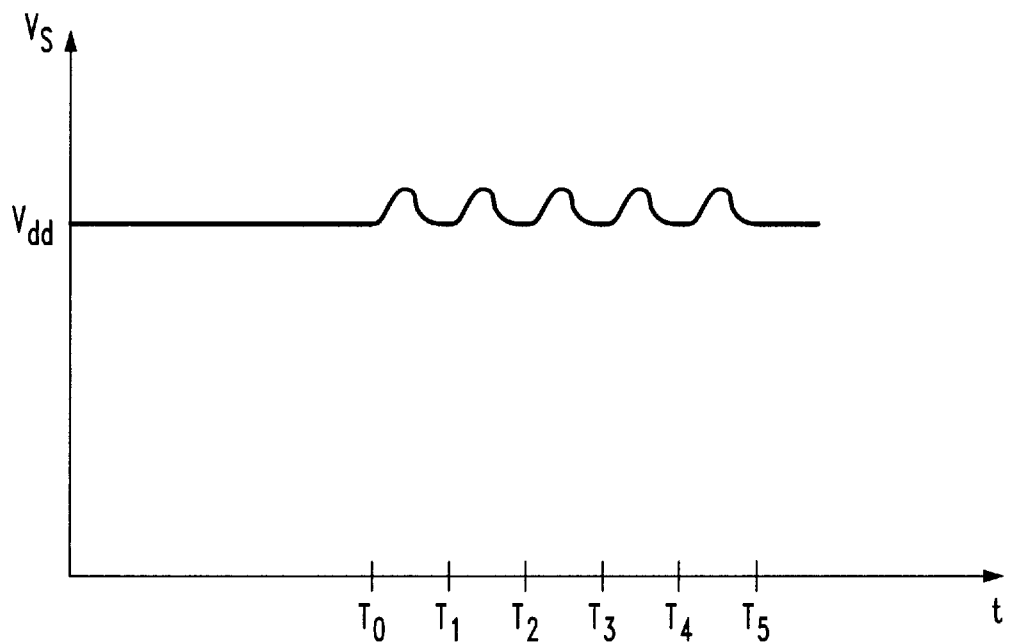
FIG. 7(a) is a graph showing the supply voltage of a chip according to the present invention during power up of one of its devices.
Figure 7B:
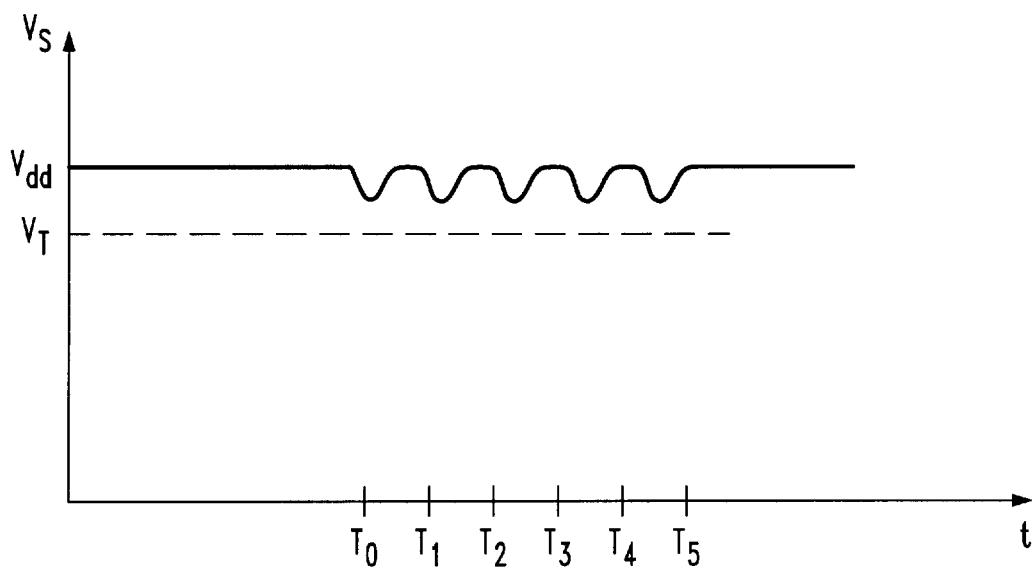
FIG. 7(b) is a graph showing the supply voltage of a chip according to the present invention during power down of one of its devices.

FIGS. 7(a) and 7(b) show the resulting voltage signal $V_{dd}$ in the exemplary embodiment. FIG. 7(a) shows the voltage signal $V_{dd}$ during a "power down" phase, and FIG. 7(b) shows the voltage signal during a "power up" phase. It should be noted that, as opposed to the voltage signal shown in FIGS. 2(a) and 2(b), the signal experiences a plurality of small variations rather than one large variation. These smaller variations cause less problems than the large variations inherent in conventional circuits. In particular, the smaller variations during the "power up" phase prevent the voltage signal from dropping below the threshold voltage $V_T$ and resetting the circuit device.

Figure 8A:
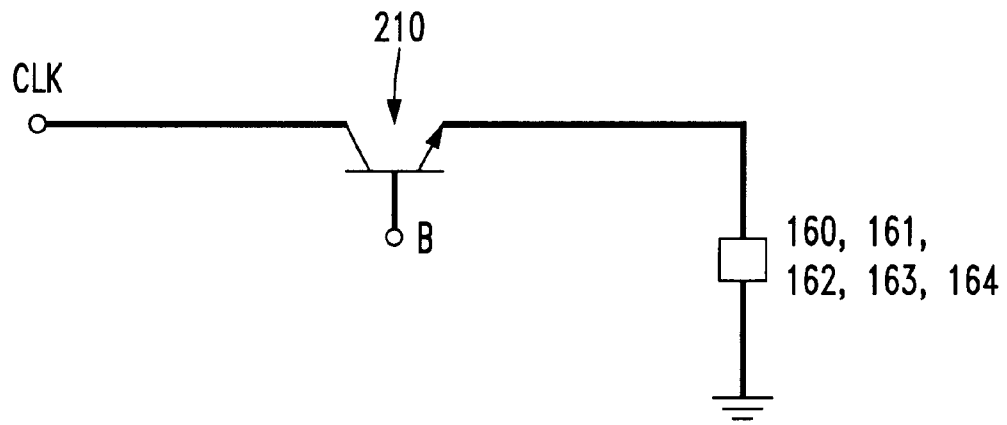
FIG. 8(a) is a schematic diagram showing a first embodiment of the switches shown in FIGS. 5(a)–5(b).
Figure 8B:
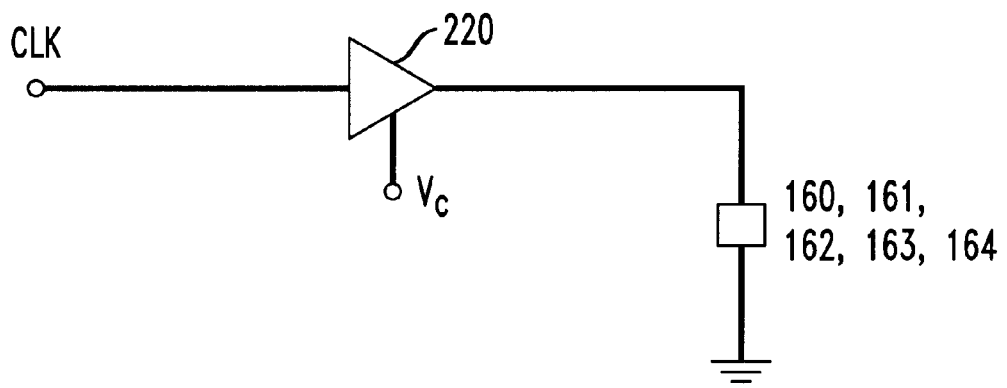
FIG. 8(b) is a schematic diagram showing a second embodiment of the switches shown in FIGS. 5(a)–5(b).

The switches $S_1$–$S_5$ can be fabricated in various ways. FIGS. 8(a) and 8(b) show first and second exemplary embodiments of the switches $S_1$–$S_5$. FIG. 8(a) shows a first exemplary embodiment wherein the switches are transistor switches 210, such as bipolar junction transistors. The transistors 210 are biased by a control signal to its base "B" which turns the switch on and off. FIG. 8(b) shows a second exemplary embodiment wherein the switches are tristateable buffers 220. The buffers 220 include a control signal line $V_c$ which controls the on and off states of the switch. In both the first and second embodiments, the control signals are supplied to the switches by either the CPU 140 or a separate controller (not shown).

Thus, the exemplary embodiment of the present invention operates to decrease variations in a voltage supply signal by introducing and removing loads in a gradual manner. By introducing a plurality of redundant loads to a circuit before an actual load is added, and by removing a plurality of redundant loads before an actual load is removed, variations that occur in the voltage supply signal due to load changes can be significantly minimized to the point where they have little or no effect on the operation of the circuit.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. An apparatus comprising:
   an electrical signal generator;
   at least one device coupled to the signal generator, said at least one device electrically coupled to the signal generator while said device is in a first state and electrically decoupled from the signal generator while said device is in a second state;
   at least one redundant load, said redundant load electrically decoupled from the signal generator while said device is in the first state and electrically coupled to the signal generator while said device is in the second state; and,
   a controller for alternately coupling said at least one redundant load and said at least one device to the signal generator,
   wherein the at least one device, the at least one redundant load and the controller are formed as an integrated circuit.

2. The apparatus of claim 1, wherein the at least one device comprises an active electrical device.

3. The apparatus of claim 1, wherein the at least one redundant load comprises at least one metal wire.

4. The apparatus of claim 1, wherein the at least one redundant load comprises at least one discrete circuit element.

5. The apparatus of claim 4, wherein the at least one discrete circuit element is selected from the group consisting of: resistors, inductors and capacitors.

6. The apparatus of claim 1, wherein the at least one device, the at least one redundant load and the controller are disposed on a printed circuit board.

7. The apparatus of claim 6, wherein the at least one redundant load comprises at least one metal trace formed on a surface of the printed circuit board.

8. The apparatus of claim 1, wherein the first and second states are the on and off states of the at least one device, respectively.

9. The apparatus of claim 8, wherein the at least one redundant load is connected to the electrical circuit immediately prior to switching the at least one device to the on state and immediately after switching the at least one device to the off state.

10. The apparatus of claim 9, wherein the at least one redundant load is removed from the electrical circuit a predetermined period of time after the at least one device switches states.

11. The apparatus of claim 1, wherein the signal generator comprises a clock signal generator.

12. The apparatus of claim 1, wherein the at least one redundant load comprises a plurality of redundant load elements.

13. The apparatus of claim 12, wherein the plurality of redundant load elements are switched on or off sequentially when the at least one device switches states.

14. The apparatus of claim 13, wherein the controller controls at least two switch elements, one connected to the at least one device and one connected to the at least one redundant load, wherein the one of the switches is open when the device is in a first state, and the other switch is closed.

15. The apparatus of claim 1, wherein the controller controls the state of at least one switch element to change the at least one device from the first state to the second state.

16. The apparatus of claim 1, wherein the at least one device and the at least one redundant load are coupled to and decoupled from the signal generator by at least one electrically conductive line.

17. The apparatus of claim 1, wherein the at least one device and the at least one redundant load are coupled to and decoupled from the signal generator by digital logic.

18. A method of reducing variation in the supply voltage of an electrical circuit comprising the steps of:
providing a supply voltage to the electrical circuit, said supply voltage supplying at least one device of the electrical circuit;
supplying a control signal to the at least one device while the device is in a first state, but not while the device is in a second state; and,
supplying the control signal to at least one redundant load while the device is in a second state so that variations in the supply voltage are reduced,
wherein the step of supplying a control signal to the at least one redundant load comprises supplying the control signal to a plurality of redundant load elements which are switched sequentially.

19. The method of claim 18, wherein the at least one device is on in the first state and off in the second state.

20. The method of claim 18, wherein the steps of supplying a control signal to the at least one device and the at least one redundant load comprise:
supplying the control signal to the redundant load immediately prior to switching the at least one device to the first state and immediately after switching the at least one device to the second state.

21. The method of claim 18, comprising the further step of:
controlling the state of at least one switch element to change the at least one device from the first state to the second state.

22. The method of claim 21, wherein the controlling step comprises:
controlling at least two switch elements to change the at least one device from the first state to the second state, one of the switch elements connected to the at least one device and one of the switch elements connected to the at least one redundant load so that one of the switches is open in the first state and the other switch is closed in the first state.

23. The method of claim 18, wherein the steps of supplying a control signal to the at least one device and the at least one redundant load comprise:
activating a plurality of switches coupled to a plurality of redundant load elements to supply the control signal to the plurality of redundant load elements;
activating a switch coupled to the at least one device to supply the control signal to the at least one device; and,
deactivating the plurality of switches individually and sequentially, to remove the control signal from the plurality of redundant load elements.

24. The method of claim 18, wherein the steps of supplying a control signal to the at least one device and the at least one redundant load comprise:
deactivating a switch coupled to the at least one device to remove the control signal from the at least one device;
activating a plurality of switches coupled to a plurality of redundant load elements to supply the control signal to the plurality of redundant load elements; and,
deactivating the plurality of switches individually and sequentially, to remove the control signal from the plurality of redundant load elements.

25. The method of claim 18, wherein the control signal is a clock signal.

26. An electrical circuit comprising:
a clock generator;
at least one device coupled to the clock generator, said device electrically connected to the clock generator while said device is in a first state and electrically disconnected from the signal generator while said device is in a second state;
at least one redundant load, said redundant load electrically disconnected from the clock generator while said device is in the first state and electrically connected from the signal generator while said device is in the second state; and,
a controller for alternately connecting the at least one redundant load and the at least one device to the clock generator.

27. An apparatus comprising:
an electrical signal generator;
at least one device coupled to the signal generator, said at least one device electrically coupled to the signal generator while said device is in a first state and electrically decoupled from the signal generator while said device is in a second state;
at least one redundant load, said redundant load electrically decoupled from the signal generator while said device is in the first state and electrically coupled to the signal generator while said device is in the second state; and,
a controller for alternately coupling said at least one redundant load and said at least one device to the signal generator,
wherein the at least one redundant load comprises a plurality of redundant load elements which are switched on or off sequentially when the at least one device switches states.

28. An apparatus comprising:
an electrical signal generator;
at least one device coupled to the signal generator, said at least one device electrically coupled to the signal generator while said device is in a first state and electrically decoupled from the signal generator while said device is in a second state;
at least one redundant load, said redundant load electrically decoupled from the signal generator while said device is in the first state and electrically coupled to the signal generator while said device is in the second state; and,
a controller for alternately coupling said at least one redundant load and said at least one device to the signal generator,
wherein the at least one device, the at least one redundant load and the controller are formed as an integrated circuit.

29. A method of reducing variation in the supply voltage of an electrical circuit comprising the steps of:

providing a supply voltage to the electrical circuit, said supply voltage supplying at least one device of the electrical circuit;

supplying a control signal to the at least one device while the device is in a first state, but not while the device is in a second state; and, supplying the control signal to at least one redundant load while the device is in a second state so that variations in the supply voltage are reduced, wherein the step of supplying a control signal to the at least one redundant load comprises supplying the control signal to a plurality of redundant load elements which are switched sequentially.

30. A method of reducing variation in the supply voltage of an electrical circuit comprising the steps of:

providing a supply voltage to the electrical circuit, said supply voltage supplying at least one device of the electrical circuit;

supplying a clock signal to the at least one device while the device is in a first state, but not while the device is in a second state; and, supplying the clock signal to at least one redundant load while the device is in a second state so that variations in the supply voltage are reduced.

* * * * *